United States Patent
Huang et al.

(10) Patent No.: US 11,746,024 B2
(45) Date of Patent: Sep. 5, 2023

(54) LITHIUM TITANATE/TITANIUM NIOBATE CORE-SHELL COMPOSITE MATERIAL AND PREPARATION METHOD THEREOF

(71) Applicant: CPC CORPORATION, TAIWAN, Kaohsiung (TW)

(72) Inventors: Jen-Hsien Huang, Kaohsiung (TW); Jui-Hsiung Huang, Kaohsiung (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 224 days.

(21) Appl. No.: 17/382,378

(22) Filed: Jul. 22, 2021

(65) Prior Publication Data

US 2022/0356072 A1 Nov. 10, 2022

(30) Foreign Application Priority Data

May 10, 2021 (TW) .................................. 110116768

(51) Int. Cl.
*C01G 23/00* (2006.01)
*C01G 33/00* (2006.01)
*H01M 10/0525* (2010.01)

(52) U.S. Cl.
CPC .......... *C01G 23/005* (2013.01); *C01G 33/00* (2013.01); *H01M 10/0525* (2013.01); *C01P 2004/03* (2013.01)

(58) Field of Classification Search
None
See application file for complete search history.

(56) References Cited

FOREIGN PATENT DOCUMENTS

| CN | 108054374 A | * 5/2018 |
| JP | 2018160432 A | * 10/2018 |

OTHER PUBLICATIONS

Machine translation of CN-108054374-A claims (Year: 2018).*
Machine translation of JP-2018160432-A claims (Year: 2018).*

* cited by examiner

*Primary Examiner* — Colin W. Slifka
*Assistant Examiner* — Logan Edward Laclair

(57) ABSTRACT

A lithium titanate/titanium niobate core-shell composite material includes a core which comprises lithium titanate; and a shell which is cladded over the core and comprises titanium niobate. A preparation method of lithium titanate/titanium niobate core-shell composite material includes (A) mixing lithium titanate powder and titanium niobate powder; and (B) granulating the mixture produced by step (A) through a spray granulation process to obtain a lithium titanate/titanium niobate composite material with titanium niobate cladding over lithium titanate. The lithium titanate/titanium niobate core-shell composite material and the preparation method thereof can be applied to a battery.

3 Claims, 8 Drawing Sheets

LITHIUM TITANATE/TITANIUM NIOBATE CORE-SHELL COMPOSITE MATERIAL AND PREPARATION METHOD THEREOF

CROSS-REFERENCE TO RELATED APPLICATION

This non-provisional application claims priority under 35 U.S.C. § 119(a) on Patent Application No(s). 110116768 filed in Taiwan, R.O.C. on May 10, 2021, the entire contents of which are hereby incorporated by reference.

BACKGROUND OF THE INVENTION

1. Field of the Invention

The present disclosure relates to a lithium titanate/titanium niobate core-shell composite material, and in particular to a core-shell composite material which comprises a core of lithium titanate and a shell of titanium niobate. The present disclosure also relates to a preparation method of lithium titanate/titanium niobate core-shell composite material, and in particular to a preparation method of lithium titanate/titanium niobate core-shell composite material granulating through a spray granulation process.

2. Description of the Related Art

Lithium batteries have the advantage of high energy density that are now the mainstream of energy storage components for portable electronic products. The material selection and modification for improving the operating voltage and the specific electrical capacity of batteries can improve the energy density of lithium battery products, and they can be applied in the field of energy storage and power mobile vehicles.

Compared with carbon material, the structures of oxide negative materials are stable and suitable for fast charging applications, in which lithium titanate ($Li_4Ti_5O_{12}$, LTO) negative material has the characteristics of "zero strain" of the charge and discharge process, showing long life, high safety and other advantages, so it can be applied to fast charging high-power lithium battery. The charge and discharge behavior of the lithium titanate is due to the redox reaction induced by $Ti^{4+}$ and $Ti^{3+}$ when embedded in lithium and released from lithium, but the theoretical electrical capacity of lithium titanate is only 175 mAh/g, which is not conducive to the application of high energy density demand.

With titanium niobate ($TiNb_2O_7$, TNO) as another titanium-based negative material, due to the fact that three sets of redox reactions of $Ti^{4+}/Ti^{3+}$, $Nb^{5+}/Ti^{4+}$ and $Nb^{4+}/Nb^{3+}$ can occur when embedded in lithium, the titanium niobate has a theoretical electrical capacity up to 387 mAh/g. In addition, lithium titanate and titanium niobate respectively have working potentials of 1.55 and 1.6 V (vs. Li), the two working potentials are so close to make the two materials ideal for composites. However, the electrical conductivity and ion conductivity of titanium niobate are too low, so the rate discharge capacity is not good, in addition to manufacturing costs of the titanium niobate are too high that is not conducive to competitiveness in the market.

BRIEF SUMMARY OF THE INVENTION

As mentioned above, lithium titanate ($Li_4Ti_5O_{12}$, LTO) and titanium niobate ($TiNb_2O_7$, TNO) each have their advantages and limitations in the application of negative materials. Therefore, if lithium titanate as the main component and part of titanium niobate can be used for the development of composite materials, it will be possible to design novel negative materials having both electrical capacity of unit gram and the rate discharge capacity.

In a system comprising two materials of lithium titanate and titanium niobate, if only the two materials of lithium titanate and titanium niobate are simply mixed to make lithium battery electrodes in a certain ratio, the difference in conductivity between lithium titanate and titanium niobate will make electrons and lithium ions prefer to choose a higher conductive component embedded, so that lithium titanate/titanium niobate composite material fails to play the offset purpose. In order to improve the disadvantages of lithium titanate with low energy density, the invention makes a lithium titanate/titanium niobate core-shell composite material, and attempts to make a novel oxide negative material with energy density and power combined with the high energy density of titanium niobate and the fast charge and discharge characteristics of lithium titanate.

To achieve the above objective and other objectives, the present disclosure provides a lithium titanate/titanium niobate core-shell composite material, comprising: a core which comprises lithium titanate; and a shell which is cladded over the core and comprises titanium niobate.

In the composite material, the weight ratio of lithium titanate powder:titanium niobate powder may be between 5:5 and 9:1.

In the composite material, the weight ratio of lithium titanate:titanium niobate may be 7:3.

To achieve the above objective and other objectives, the present disclosure also provides a preparation method of lithium titanate/titanium niobate core-shell composite material, comprising: (A) mixing lithium titanate powder and titanium niobate powder; and (B) granulating the mixture produced by step (A) through a spray granulation process to obtain a lithium titanate/titanium niobate composite material with titanium niobate cladding over lithium titanate.

In the preparation method, in the step (A), the lithium titanate powder can be produced by spray granulation, solid phase method, sol gel method or co-precipitation method.

In the preparation method, in the step (A), the titanium niobate powder can be produced by sol gel method, co-precipitation method or hydrothermal method.

In the preparation method, in the step (A), the titanium niobate powder may comprise doped tungsten elements.

In the preparation method, in the step (A), the lithium titanate powder and titanium niobate powder may be produced by respectively sintering the precursor of lithium titanate and precursor of titanium niobate at a temperature of 500 to 1000° C. with a time of holding temperature of 1 hour to 10 hours.

In the preparation method, in the step (A), the weight ratio of lithium titanate powder:titanium niobate powder may be between 5:5 and 9:1.

The present invention provides a lithium titanate/titanium niobate core-shell composite material and preparation method thereof. The lithium titanate/titanium niobate core-shell composite material having a special core-shell structure of the present invention can be applied to a battery, and the battery has a better charge and discharge properties, can also reduce the production cost.

DETAILED DESCRIPTION OF THE INVENTION

The implementation of the present invention is illustrated by the specific embodiments as follows, so one skilled in the art may understand other advantages and effects of the present invention by the contents disclosed in the specification. The present invention may also be implemented or applied by other embodiments, and the details in the specification may also be based on different views and applications without departing from the spirit of the present invention for various modifications and variations.

Unless otherwise stated herein, the singular forms of "a" and "the" used in the specification and the appended claims include the plural meaning.

Unless otherwise stated herein, the technical term of "or" used in the specification and the appended claims comprises the meaning of "or/and".

Embodiment 1: (Lithium Titanate/Titanium Niobate Core-Shell Composite Material)

Figure 1:
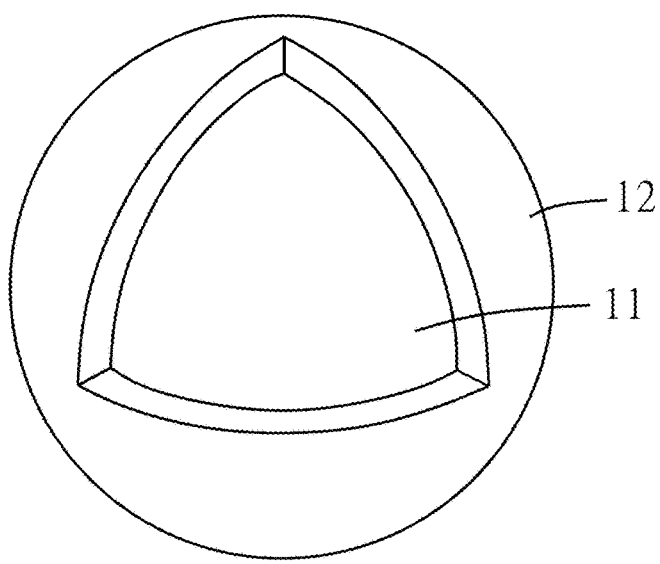
FIG. 1 is a schematic view of a lithium titanate/titanium niobate core-shell composite material according to the embodiment 1 of the present disclosure.

Referring to FIG. 1, as shown in the drawing, the lithium titanate/titanium niobate core-shell composite material 10 of the embodiment 1 comprises: a core 11 which comprises lithium titanate; and a shell 12 which is cladded over the core and comprises titanium niobate.

In the embodiment 1, the chemical formula of lithium titanate is ($Li_4Ti_5O_{12}$); and the chemical formula of titanium niobate is ($TiNb_2O_7$).

In the embodiment 1, the weight ratio of lithium titanate: titanium niobate is 7:3, but the present invention is not limited to herein, a person having ordinarily knowledge in the art may adjust the weight ratio based on actual demand, for example, the weight ratio may be between 5:5 and 9:1.

In another embodiment, the lithium titanate/titanium niobate core-shell composite material 10 of the embodiment 1 may further comprise doped tungsten elements.

Embodiment 2: (Preparation Method of Lithium Titanate/Titanium Niobate Core-Shell Composite Material)

Figure 2:
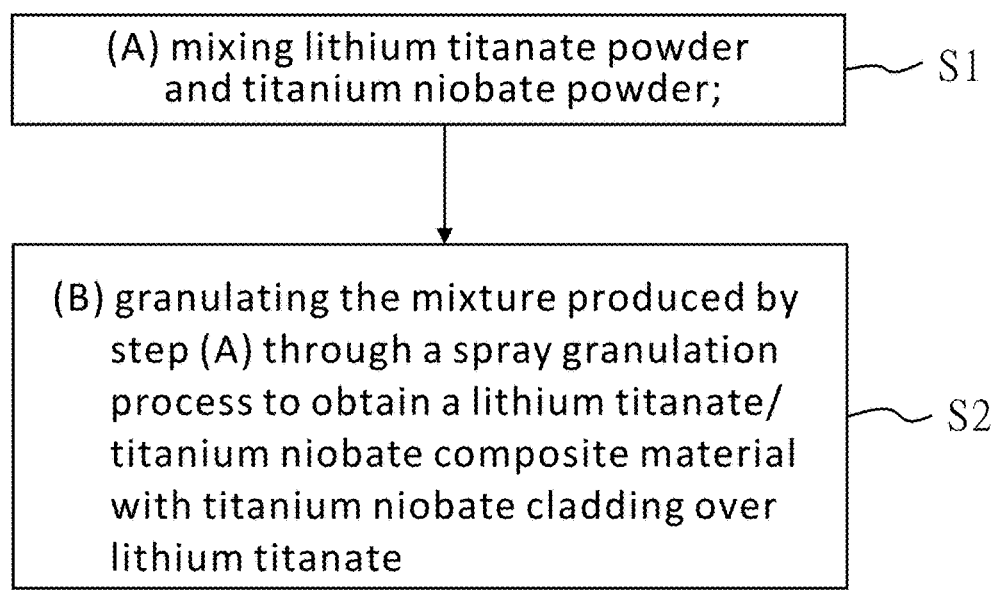
FIG. 2 is a flow chart of a preparation method of the lithium titanate/titanium niobate core-shell composite material according to the embodiment 2 of the present disclosure.

Referring to FIG. 2, as shown in the drawing, the preparation method of lithium titanate/titanium niobate core-shell composite material of the embodiment 2 comprises S1 of (A) mixing lithium titanate powder and titanium niobate powder; and S2 of (B) granulating the mixture produced by step (A) through a spray granulation process to obtain a lithium titanate/titanium niobate composite material with titanium niobate cladding over lithium titanate.

In the step (A), the preparation method of lithium titanate powder is not specifically limited, for example, the lithium titanate powder can be produced by spray granulation, solid phase method, sol gel method or co-precipitation method.

In the step (A), the preparation method of titanium niobate powder is not specifically limited, for example, the titanium niobate powder can be produced by sol gel method, co-precipitation method or hydrothermal method.

In the step (A), the titanium niobate powder may optionally comprise doped tungsten elements.

In the step (A), the lithium titanate powder and titanium niobate powder are preferably produced by respectively sintering the precursor of lithium titanate and precursor of titanium niobate at a temperature of 500 to 1000° C. with a time of holding temperature of 1 to 10 hours, but the present invention is not limited to herein.

In the step (A), the weight ratio of lithium titanate powder:titanium niobate powder may be between 5:5 and 9:1, but the present invention is not limited to herein, a person having ordinarily knowledge in the art may adjust the weight ratio based on actual demand.

The preparation method of lithium titanate/titanium niobate core-shell composite material in the embodiment 2 may be implemented by the following preparation examples, but the present invention is not limited to herein.

Preparation Example 1: (Preparation Method of Lithium Titanate)

411.34 g titanium dioxide ($TiO_2$), 155.2 g lithium carbonate ($Li_2CO_3$), 11.34 g magnesium acetate tetrahydrate ($Mg(CH_3COO)_2.4H_2O$), 24.33 g chromium acetate ($Cr(CH_3COO)_3.nH_2O$) and 14.91 g ammonium dihydrogen phosphate ($NH_4H_2PO_4$) and 60 ml of 10% polyvinyl alcohol (PVA) aqueous solution are made up in 1360 mL of deionized water, and after grinding and dispersing, a precursor of lithium titanate ($Li_4Ti_5O_{12}$, LTO) is produced by a spray granulation process, and then a fast-charging type lithium titanate powder with spinel structure can be obtained by sintering at a temperature of 800° C. with a time of holding temperature of 2 hours in nitrogen atmosphere. A person having ordinarily knowledge in the art may adjust the sintering temperature and the time of holding temperature of preparation example 1 according to the situation, for example, a preferable sintering temperature is between 500° C. and 1000° C., and a preferable time of holding temperature is between 1 hour and 10 hours.

Figure 3:
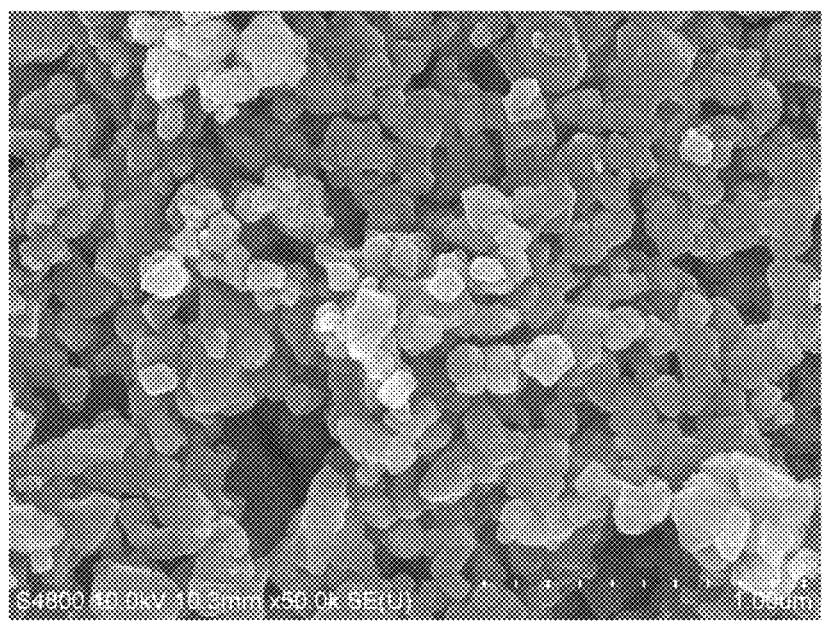
FIG. 3 is a scanning electron microscope image of lithium titanate powder produced by the preparation example 1.

The scanning electron microscope image of lithium titanate powder produced by the preparation example 1 is shown in FIG. 3.

Preparation Example 2-1: (Preparation Method of Titanium Niobate Powder without Doping Tungsten)

After dissolving the niobium pentachloride ($NbCl_5$) and titanium isopropoxide ($Ti[OCH(CH_3)_2]_4$) in ethanol, the hydrothermal reaction is carried out at a temperature of 180° C. for 1 hour. After washing and drying the resulting product with ethanol and deionized water, the resulting powder is a precursor of titanium niobate ($TiNb_2O_7$, TNO), and then a titanium niobate powder with monoclinic structure can be obtained by further sintering the precursor of titanium niobate at a temperature of 800° C. with a time of holding temperature of 2 hours in nitrogen atmosphere. A person having ordinarily knowledge in the art may adjust the sintering temperature and the time of holding temperature of preparation example 2-1 according to the situation, for example, a preferable sintering temperature is between 500° C. and 1000° C., and a preferable time of holding temperature is between 1 hour and 10 hours.

Preparation Example 2-2: (Preparation Method of Titanium Niobate Powder with Doping Tungsten)

After dissolving the niobium pentachloride ($NbCl_5$) and titanium isopropoxide ($Ti[OCH(CH_3)_2]_4$) in ethanol, and tungsten acid ($H_2WO_4$), dissolved in ammonia water, is then added to the above solution, the hydrothermal reaction is carried out at a temperature of 180° C. for 1 hour. After washing and drying the resulting product with ethanol and deionized water, the resulting powder is a precursor of titanium niobate ($TiNb_2O_7$, TNO), and then a titanium niobate powder with monoclinic structure can be obtained by further sintering the precursor of titanium niobate at a temperature of 800° C. with a time of holding temperature of 2 hours in nitrogen atmosphere. A person having ordinarily knowledge in the art may adjust the sintering temperature and the time of holding temperature of preparation example 2-2 according to the situation, for example, a preferable sintering temperature is between 500° C. and 1000° C., and a preferable time of holding temperature is between 1 hour and 10 hours.

Figure 4:
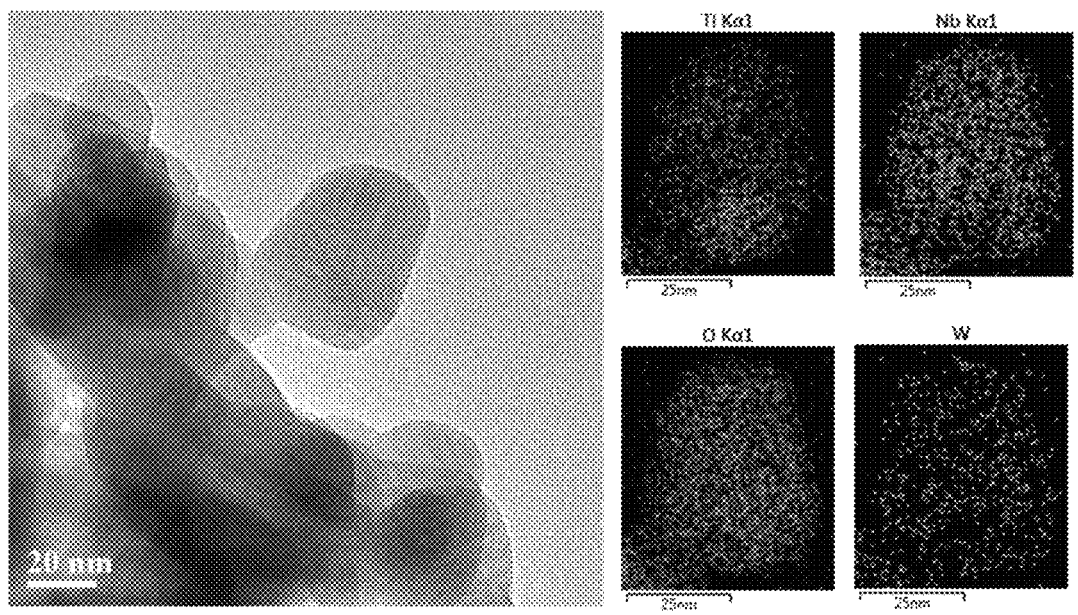
FIG. 4 shows a transmission electron microscope image and element analysis diagrams of titanium niobate powder produced by the preparation example 2-2 of the present disclosure.

The transmission electron microscope image and element analysis diagrams of titanium niobate powder produced by the preparation example 2-2 sintering at 800° C. are shown in FIG. 4. The left side of FIG. 4 is a transmission electron microscope image of titanium niobate powder in the preparation example 2-2; the upper left-hand on the right side is a distribution graph of titanium (Ti) elements; the upper right-hand on the right side is a distribution graph of niobium (Nb) elements; and the lower left-hand on the right side is a distribution graph of oxygen (O) elements. As can be seen from FIG. 4, making a contrast with FIG. 3, the particle size of titanium niobate powder produced by the preparation example 2-2 sintering at 800° C. is smaller than that of lithium titanate powder produced by the preparation example 1, and as can be seen from an element distribution graph at the lower right corner, elements of titanium, niobium and oxygen are evenly distributed in the titanium niobate powder produced by the preparation example 2-2, and tungsten elements are evenly doped in the titanium niobate powder produced by the preparation example 2-2.

Preparation Example 3-1: (Preparation Method of Lithium Titanate/Titanium Niobate Core-Shell Composite Material without Doping Tungsten, the Weight Ratio of Lithium Titanate:Titanium Niobate is 7:3)

After mixing the sintered lithium titanate powder produced by the preparation example 1 with the titanium niobate powder produced by the preparation example 2-1 by the weight ratio of 7:3 (the present invention is not limited to herein, a person having ordinarily knowledge in the art may change the mixing ratio of the two according to the needs), the lithium titanate/titanium niobate core-shell composite material can be produced by spray granulation.

Figure 5:
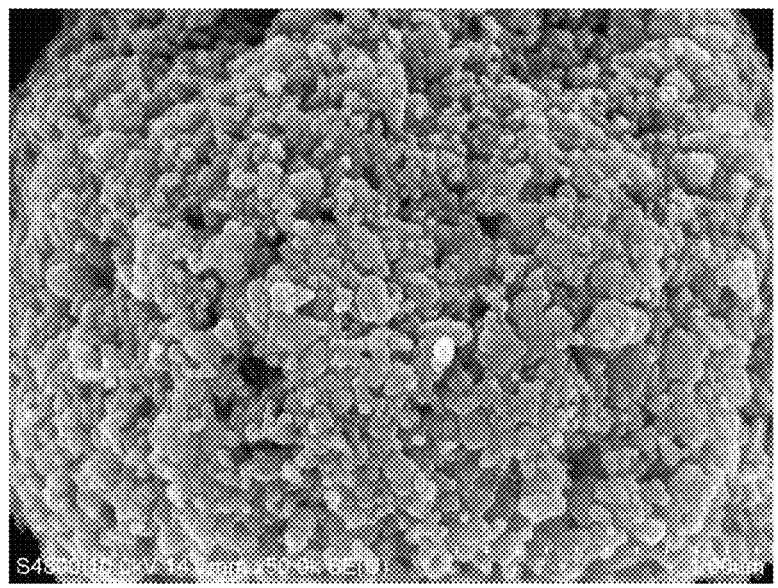
FIG. 5 is a scanning electron microscope image of the lithium titanate/titanium niobate core-shell composite material produced by the preparation example 3-1.

The scanning electron microscope image of the lithium titanate/titanium niobate core-shell composite material produced by the preparation example 3-1 is shown in FIG. 5. As can be seen from FIG. 5, making a contrast with FIG. 3 only comprising the lithium titanate powder, the titanium niobate powder with a smaller particle size of FIG. 5 forms a shell, and the shell formed by the titanium niobate is evenly cladded over the core formed by the lithium titanate powder with a larger particle size.

Figure 6:
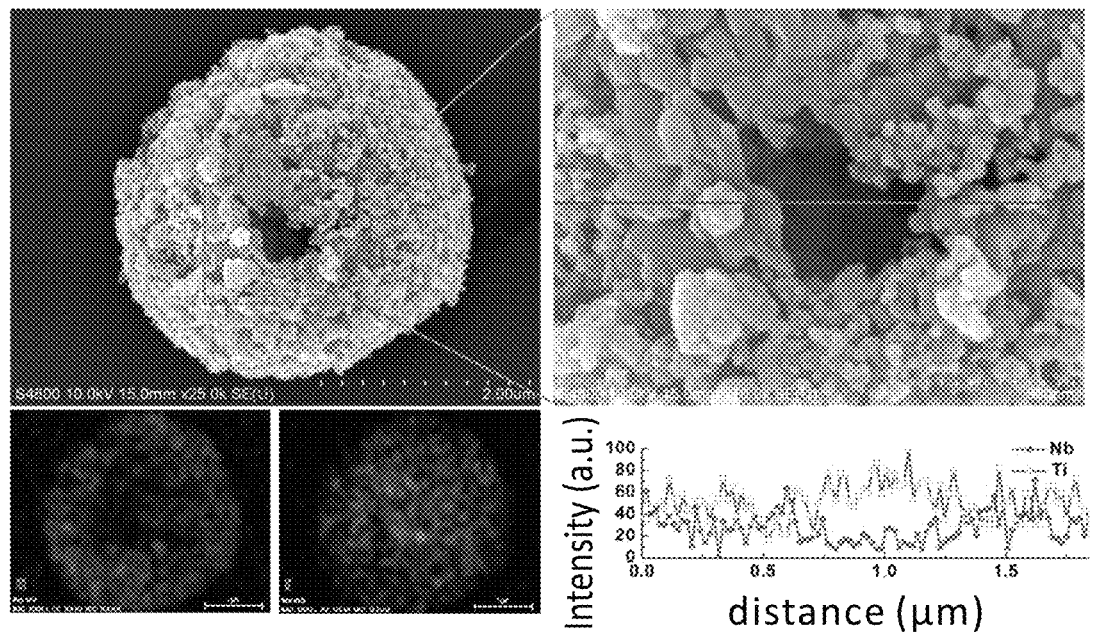
FIG. 6 shows scanning electron microscope images and element analysis diagrams of the lithium titanate/titanium niobate core-shell composite material with a notch in the shell.

In order to confirm that the lithium titanate/titanium niobate core-shell composite material produced by the preparation example 3-1 comprises the core formed by lithium titanate powder and the shell formed by titanium niobate powder, the lithium titanate/titanium niobate core-shell composite material with a notch in the shell is taken for element analysis, and the results are shown in FIG. 6. The upper left side of FIG. 6 is the scanning electron microscope image of the lithium titanate/titanium niobate core-shell composite material with a notch in the shell; the lower left-hand on the left side is a distribution graph of niobium (Nb) elements; the lower right-hand on the left side is a distribution graph of titanium (Ti) elements; The upper right side is the scanning electron microscope image enlarged by the notch section; and the lower right side is an analytical graph of the signal strength relative to the distance of the niobium elements and titanium elements made from the line intercept in the scanning electron microscope image enlarged by the notch section of the upper right side. As can be seen from FIG. 6, compared with other sections, the distribution of niobium element at the notch is significantly reduced, and the distribution of titanium elements is significantly increased, which can be confirmed that the core of lithium titanate/titanium niobate core-shell composite material produced by the preparation example 3-1 is composed of lithium titanate with a high titanium content, and the shell is composed of titanium niobate comprising niobium elements.

Preparation Example 3-2: (Preparation Method of Lithium Titanate/Titanium Niobate Core-Shell Composite Material without Doping Tungsten, the Weight Ratio of Lithium Titanate:Titanium Niobate is 9:1)

The preparation example 3-2 is basically the same as the preparation example 3-1, the difference is only in that the preparation example 3-2 mixes the sintered lithium titanate powder produced by the preparation example 1 and titanium niobate powder produced by the preparation example 2-1 in a ratio of 9:1, and then spray granulation is carried out.

Figure 7:
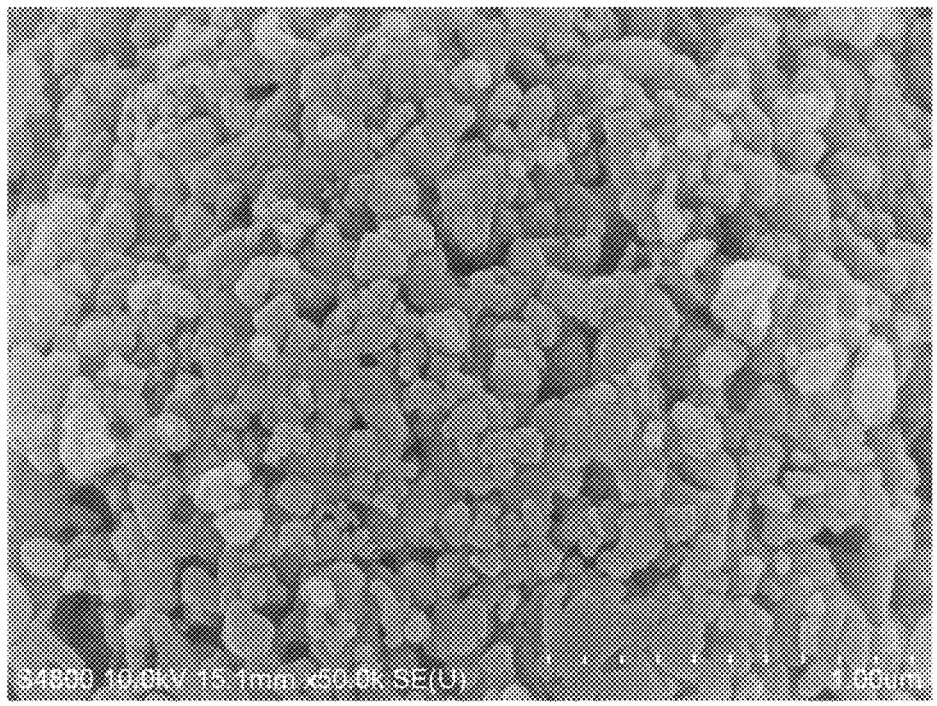
FIG. 7 is a scanning electron microscope image of the lithium titanate/titanium niobate core-shell composite material produced by the preparation example 3-2.

The scanning electron microscope image of the lithium titanate/titanium niobate core-shell composite material produced by the preparation example 3-2 is shown in FIG. 7. As can be seen from FIG. 7, making a contrast with FIG. 3 only comprising the lithium titanate powder, the titanium niobate powder with a smaller particle size of FIG. 7 forms a shell, and the shell formed by the titanium niobate is evenly cladded over the core formed by the lithium titanate powder with a larger particle size.

Preparation Example 3-3: (Preparation Method of Lithium Titanate/Titanium Niobate Core-Shell Composite Material without Doping Tungsten, the Weight Ratio of Lithium Titanate:Titanium Niobate is 5:5)

The preparation example 3-3 is basically the same as the preparation example 3-1, the difference is only in that the preparation example 3-3 mixes the sintered lithium titanate powder produced by the preparation example 1 and titanium niobate powder produced by the preparation example 2-1 in a ratio of 5:5, and then spray granulation is carried out.

Figure 8:
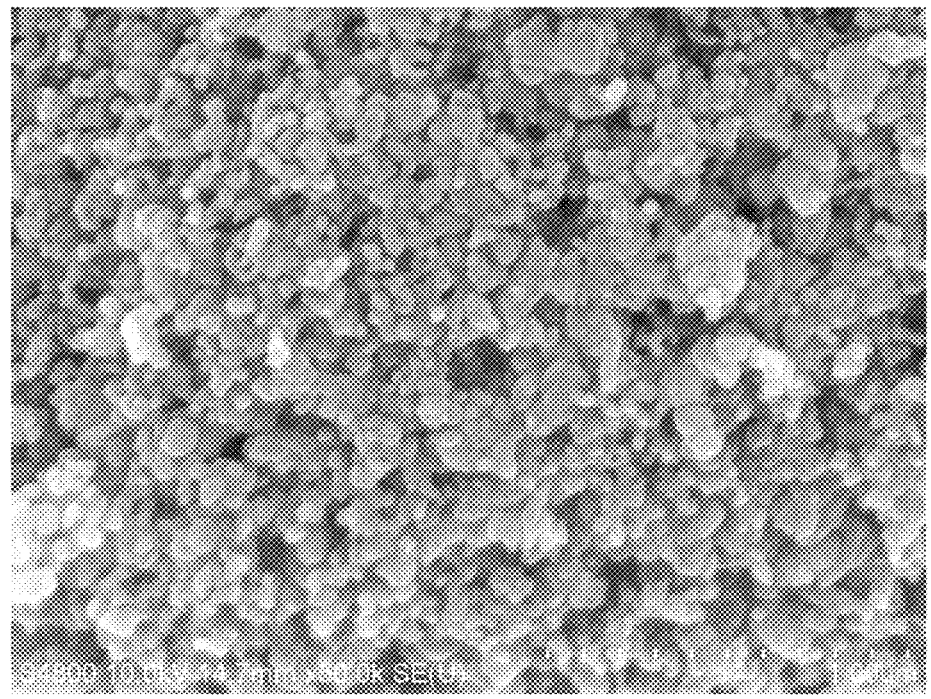
FIG. 8 is a scanning electron microscope image of the lithium titanate/titanium niobate core-shell composite material produced by the preparation example 3-3.

The scanning electron microscope image of the lithium titanate/titanium niobate core-shell composite material produced by the preparation example 3-3 is shown in FIG. 8. As can be seen from FIG. 8, making a contrast with FIG. 3 only comprising the lithium titanate powder, the titanium niobate powder with a smaller particle size of FIG. 8 forms a shell, and the shell formed by the titanium niobate is evenly cladded over the core formed by the lithium titanate powder with a larger particle size.

Preparation Example 3-4: (Preparation Method of Lithium Titanate/Titanium Niobate Core-Shell Composite Material with Doping Tungsten)

The preparation example 3-4 is basically the same as the preparation example 3-1, the difference is only in that the preparation example 3-4 mixes the sintered lithium titanate powder produced by the preparation example 1 and titanium niobate powder with doping tungsten produced by the preparation example 2-2 in a ratio of 7:3, and then spray granulation is carried out.

In summary, in the preparation method of lithium titanate/titanium niobate core-shell composite material of the embodiment 2, the weight ratio of lithium titanate powder:titanium niobate powder is not specifically limited, a person having ordinarily knowledge in the art may properly adjust the weight ratio based on actual demand. In addition, the doping of tungsten elements is optional, a person having ordinarily knowledge in the art can choose whether to dope tungsten elements based on the actual demand.

Test Example 1

When the lithium titanate/titanium niobate core-shell composite material of the present invention is applied to a battery, in order to understand the effect of lithium titanate/titanium niobate core-shell composite material on the charge and discharge performance of the battery, the battery can be prepared in the following manner, and tested for charge and discharge.

First, 1.5 g polyvinylidene fluoride is added to 24.75 g N-methylpyrrolidinone (NMP) for mixing, after polyvinylidene fluoride is fully dissolved, 12 g lithium titanate/titanium niobate core-shell composite material of the preparation example 3-1 (without doping tungsten, the weight ratio of lithium titanate:titanium niobate is 7:3) is added in sequence. After 1.5 g conductive carbon material is fully mixed, the slurry is coated on 18 micron aluminum foil with a 120 micron scraper, and baked in an oven of 120° C. to complete the preparation of the battery plate, wherein the weight ratio of active substance:conductive carbon material:adhesive is 80:10:10. Before the battery is assembled, the plate is baked for 12 hours in a vacuum environment of 120° C., then the plate is placed in a glove box, using lithium metal as a counter electrode, and the electrolyte is 1M LiPF$_6$ with ethylene carbonate (EC) and diethyl carbonate (DEC), wherein ethylene carbonate and diacetyl carbonate are mixed by a volume ratio of 1:1, a button-type semi-battery is assembled by lithium metal, separator, electrolyte and plate, and the subsequent electrical testing is carried out.

Figure 9:
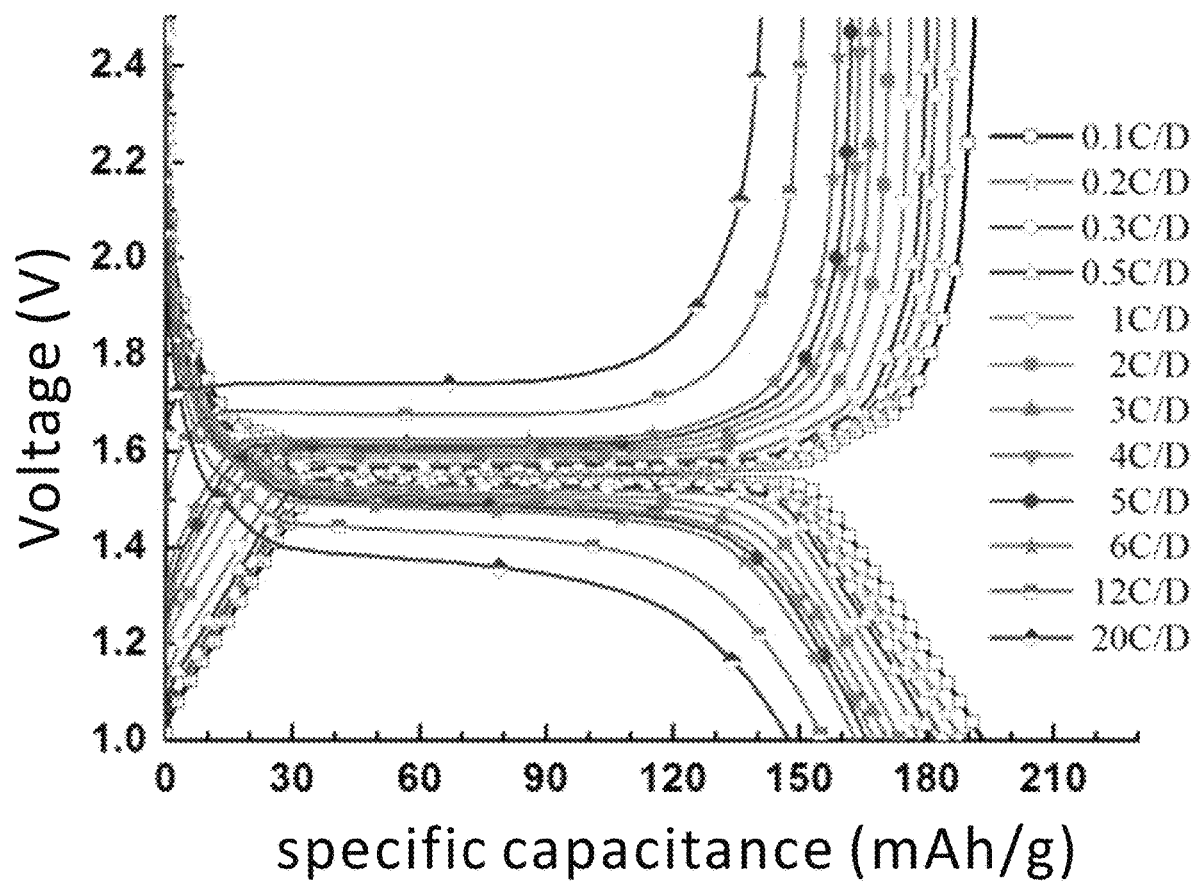
FIG. 9 shows charge and discharge test results for the battery applying lithium titanate/titanium niobate core-shell composite material of the preparation example 3-1.

The charge and discharge test results for the battery applying lithium titanate/titanium niobate core-shell composite material of the preparation example 3-1 are shown in FIG. 9.

Comparative Test Example 1

In order to contrast the effect of lithium titanate/titanium niobate core-shell composite material in improving the charge and discharge performance of the battery, the battery is prepared for electrical testing according to the method described in the test example 1, but the lithium titanate/titanium niobate core-shell composite material of the preparation example 3-1 is replaced with the traditional mixed lithium titanate/titanium niobate material, the above-mentioned traditional mixed lithium titanate/titanium niobate material is obtained after mixing the lithium titanate powder produced by the preparation example 1 and the titanium niobate powder produced by the preparation example 2-1 with a weight ratio of 7:3.

According to the above, the test example 1 and comparative test example 1 have the same weight ratio of lithium titanate:titanium niobate of 7:3, and the same without doping tungsten, the difference between the two is only in whether lithium titanate/titanium niobate material has a core-shell structure.

Figure 10:
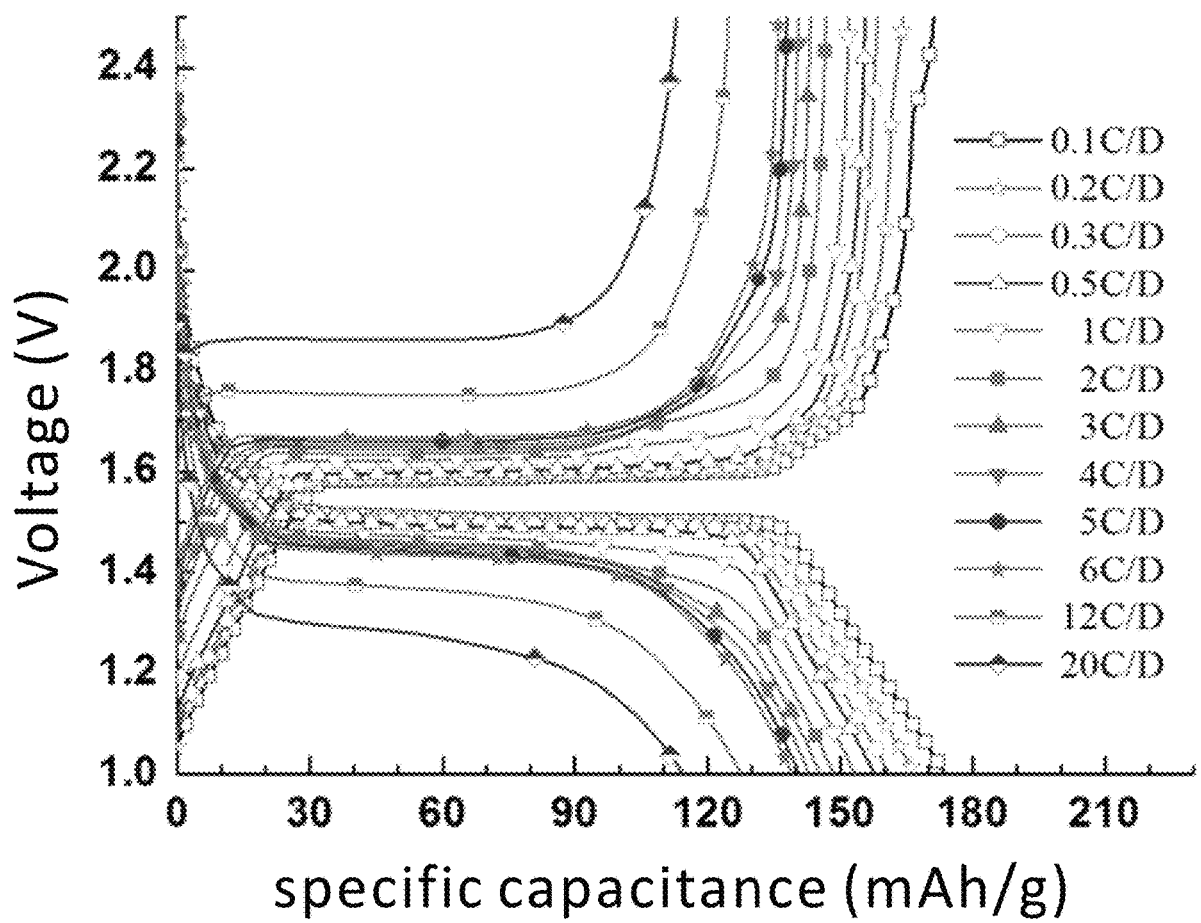
FIG. 10 shows charge and discharge test results for the battery applying the traditional mixed lithium titanate/titanium niobate material.

The charge and discharge test results for the battery using the traditional mixed lithium titanate/titanium niobate material are shown in FIG. 10.

Making a contrast with FIG. 9 and FIG. 10, it can be seen that, compared with the traditional mixed lithium titanate/titanium niobate material, the lithium titanate/titanium niobate core-shell composite material of the present invention can be applied to a battery, and the battery has a more excellent charge and discharge performance, which is due to the special core-shell structure of lithium titanate/titanium niobate core-shell composite material of the present invention.

Test Example 2

Figure 11:
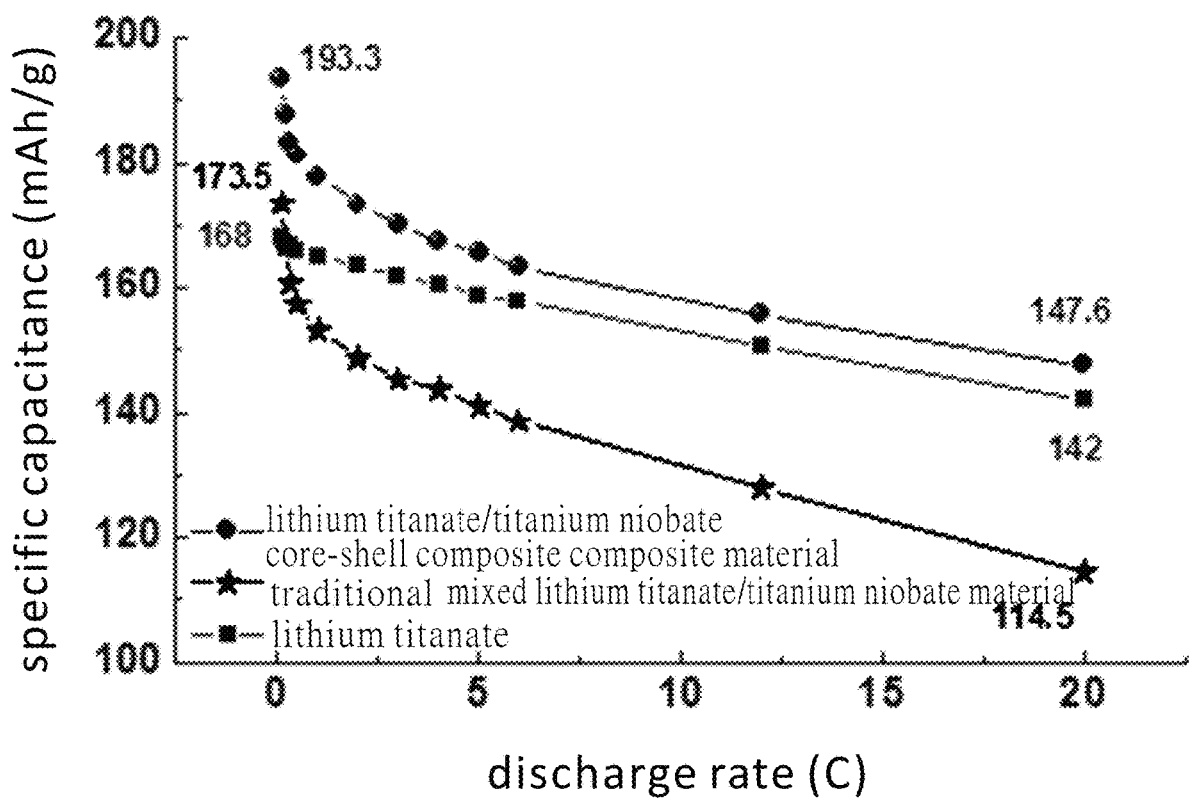
FIG. 11 shows electrical test results for the batteries comprising different materials of the lithium titanate/titanium niobate core-shell composite material of the preparation example 3-1, the traditional mixed lithium titanate/titanium niobate material of the comparative test example 1 and the lithium titanate powder produced by the preparation example 1.

According to the method described in the test example 1, the lithium titanate/titanium niobate core-shell composite material of the preparation example 3-1 (without doping tungsten, the weight ratio of lithium titanate:titanium niobate is 7:3), the traditional mixed lithium titanate/titanium niobate material of the comparative test example 1 (without doping tungsten, the weight ratio of lithium titanate:titanium niobate is 7:3) and the lithium titanate powder produced by the preparation example 1 are respectively taken the same weight (12 g) to prepare three individual batteries comprising different materials, and electrical testing is carried out, a chart of discharge rate versus specific capacitance is plotted after testing, the results are shown in FIG. 11.

As can be seen from FIG. 11, at the same discharge rate, compared with the traditional mixed lithium titanate/titanium niobate material and the lithium titanate powder, the lithium titanate/titanium niobate core-shell composite material of the present invention can be applied to a battery, and the battery has a more excellent charge and discharge performance, which is due to the special core-shell structure of lithium titanate/titanium niobate core-shell composite material of the present invention.

Figure 12:
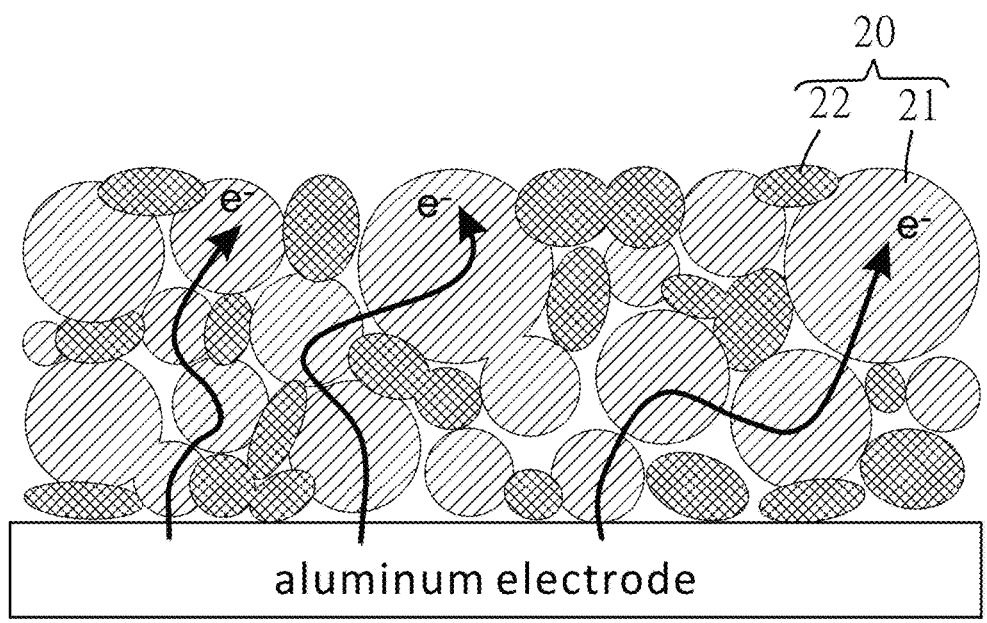
FIG. 12 is schematic view of the traditional mixed lithium titanate/titanium niobate material applying to a battery.
Figure 13:
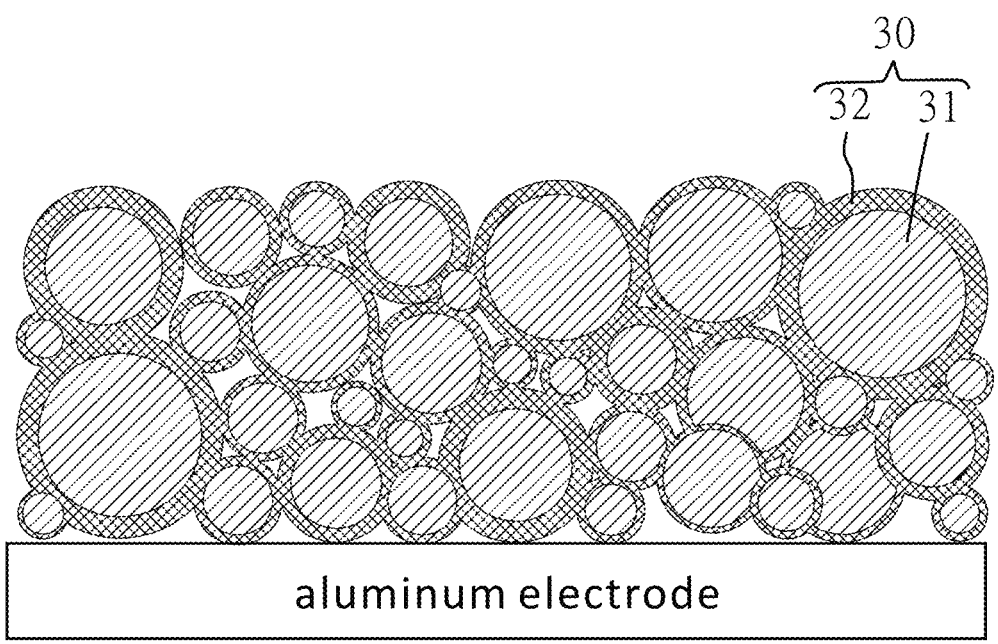
FIG. 13 is a schematic view of the lithium titanate/titanium niobate core-shell composite material of the preparation example 3-1 applying to a battery.

As can be seen from FIG. 12, because the traditional mixed lithium titanate/titanium niobate material 20 only mixes lithium titanate powder 21 and titanium niobate powder 22, there are still electrical contacts among the lithium titanate powders 21. When it is applied to a battery, electrons will flow and follow the path among the lithium titanate powders with high conductivity, forcing a conductivity equalization, charge and discharge properties of the battery cannot be effectively enhanced. In contrast, as can be seen from FIG. 13, the lithium titanate/titanium niobate core-shell composite material 30 of the present invention has a core-shell structure, so that the outer layer of lithium titanate powder 31 is cladded by titanium niobate powder 32, thus avoiding electrons flowing and following the paths among the lithium titanate powders with high conductivity. When it is applied to a battery, the characteristics of the high theoretical electrical capacity of titanium niobate powder 32 can give fully functioning to enhance the charge and discharge properties. Also, it can also reduce the use of titanium niobate powder 32 in order to reduce production costs.

While the present disclosure has been described by means of specific embodiments, numerous modifications and variations could be made thereto by those skilled in the art without departing from the scope and spirit of the present disclosure set forth in the claims.

What is claimed is:

1. A lithium titanate/titanium niobate core-shell composite material, comprising:
   a core, comprising lithium titanate; and
   a shell, cladded over the core and comprising titanium niobate,
   wherein the composite material further comprises doped tungsten elements.

2. The composite material according to claim 1, wherein the weight ratio of lithium titanate:titanium niobate is between 5:5 and 9:1.

3. The composite material according to claim 2, wherein the weight ratio of lithium titanate:titanium niobate is 7:3.

* * * * *